(12) United States Patent
Janardhanan et al.

(10) Patent No.: US 9,094,235 B2
(45) Date of Patent: Jul. 28, 2015

(54) SYSTEMS AND METHODS FOR LINK BANDWIDTH CONSERVATION IN A LOCAL AREA NETWORK CONNECTED TO A TRILL NETWORK

(71) Applicant: DELL PRODUCTS L.P., Round Rock, TX (US)

(72) Inventors: Pathangi Narasimhan Janardhanan, Tamilnadu (IN); Ramasubramani Mahadevan, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 13/688,177

(22) Filed: Nov. 28, 2012

(65) Prior Publication Data
US 2014/0146822 A1    May 29, 2014

(51) Int. Cl.
*H04L 12/56* (2006.01)
*H04L 12/46* (2006.01)

(52) U.S. Cl.
CPC ........ *H04L 12/4641* (2013.01); *H04L 12/4625* (2013.01)

(58) Field of Classification Search
None
See application file for complete search history.

(56) References Cited

U.S. PATENT DOCUMENTS

| 8,756,602 B2 * | 6/2014 | Narayanasamy et al. ........ 718/1 |
| 2009/0232134 A1 * | 9/2009 | Lamouline .................... 370/389 |
| 2012/0275347 A1 * | 11/2012 | Banerjee et al. ............. 370/256 |

* cited by examiner

*Primary Examiner* — Kibrom T Hailu
(74) *Attorney, Agent, or Firm* — Haynes and Boone, LLP

(57) ABSTRACT

An information handling system is provided. The information handling system includes systems and methods for providing link bandwidth conservation between a local area network and a TRILL campus network. Such an information handling system includes a plurality of processing modules provided by a computer processor where the plurality of processing modules including a selective packet filter and a control plane unit and memory in communication with the plurality of processing modules. The memory stores a VLAN port bitmap and a snooping table. The information handling system also has a plurality of ports, which includes at least one Ethernet port for connecting the information handling device to a LAN and a plurality of bridging ports for connecting the information handling device to a plurality of routing bridges.

11 Claims, 5 Drawing Sheets

| Routing Bridge ID 402 | Ingress Port ID 404 | VLAN Mapping 406 | Routing Bridge Neighbors List 408 |
|---|---|---|---|
| RB1 | 1 | VLAN 10 - 20 | RB2, RB3 |
| RB2 | 2 | VLAN 100 - 200 | RB1, RB3 |
| RB3 | 3 | VLAN 300 - 400 | RB1, RB2 |
| RB1 | 9 | VLAN 1000 - 2000 | RB2, RB3 |
| RB2 | 10 | VLAN 1500 - 1700 | RB1, RB3 |
| RB3 | 11 | VLAN 2000 - 2200 | RB1, RB2 |

SYSTEMS AND METHODS FOR LINK BANDWIDTH CONSERVATION IN A LOCAL AREA NETWORK CONNECTED TO A TRILL NETWORK

BACKGROUND

1. Technical Field

The present disclosure is related to information handling systems. In particular, embodiments disclosed herein are related to providing services for connecting TRILL networks to Ethernet LAN segments.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, information handling system may include a wide variety of network implementations, such as local area networks (LANs), TRILL campus networks, and wide area networks. These implementations are often interconnected so that, for example, resources accessible through a LAN can be accessed from the wide area network. Likewise, these the wide area network may make resources accessible to the LAN. However, certain inefficiencies can occur at the interconnections between these network implementations that lead for the transmission of more packets that would be optimal. This can be result in wasted bandwidth between two network implementations.

SUMMARY

Consistent with some embodiments, there is provided an information handling device. The information handling device may include a plurality of processing modules provided by a computer processor, a memory in communication with the plurality of processing modules, and a plurality of ports. In the information handling device, the plurality of processing modules may include a selective packet filter and a control plane unit and the memory may store a virtual local area network (VLAN) profile database and a snooping table. Additionally, the plurality of ports may include at least one Ethernet port for connecting the information handling device to an Ethernet network and a plurality of bridging ports for connecting the information handling device to a plurality of routing bridges.

Consistent with some embodiments, there is further provided an information handling system. The system may include a plurality of hosts connected to an Ethernet network, a plurality of switches connected to the Ethernet network, and a plurality of bridging devices connected to the plurality of switches. The plurality of bridging devices may be connected to a wider area network and include edge bridging devices and core bridging device, with the edge bridging devices being directly connected to the plurality of switches. The information handling system further includes a first virtual local-area network (VLAN), which in turn includes at least some of the plurality of hosts, the Ethernet network, and a first switch of the plurality of switches. Additionally, a first bridging device of the plurality of bridging devices may be designated to forward first VLAN traffic with the first switch being configured to send first VLAN traffic only to the first bridging device.

Other embodiments may provide a method for providing link bandwidth conversation in a local-area network (LAN) connected to a larger network. The method may include providing a plurality of bridging devices and a plurality of switches and designating a first bridging device of the plurality of routing bridge devices to be a first VLAN forwarder. The first VLAN forwarder may be configured to forward certain types of packets on behalf of a first switch of the plurality of switches, where the first switch is associated with a first VLAN. The method may further include receiving, at the first switch, a packet from the first VLAN, applying a mask to prevent the packet from being transmitted to some of the plurality of routing bridge devices, and transmitting the packet from the first switch to the first VLAN forwarder. The packet may be one of the certain types of packets.

These and other embodiments will be described in further detail below with respect to the following figures.

Figure 1:
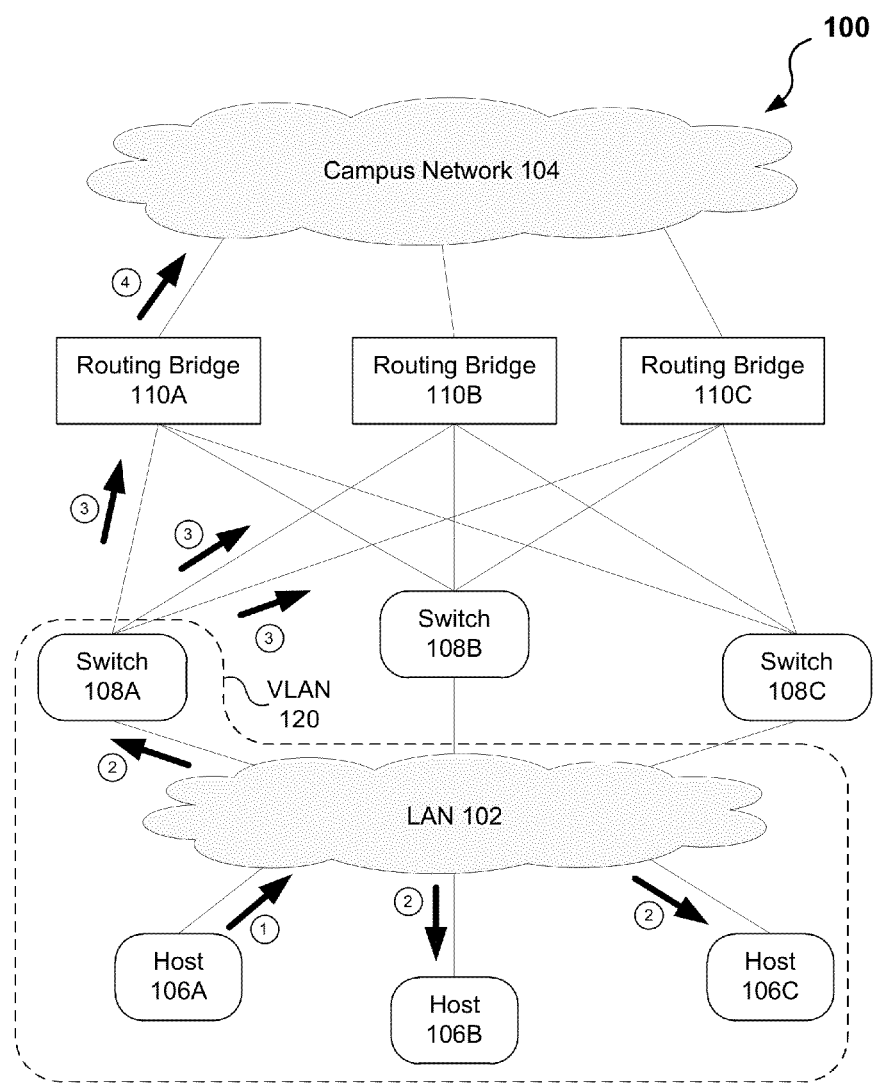
FIG. 1 depicts an information handling system that includes a local-area network connected to a campus network.

In the drawings, elements having the same designation have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 shows an exemplary information handling system 100 that includes two interconnected networks of different sizes. Information handling system 100 includes local area network (LAN) 102 and a campus network 104. In the depicted embodiment, the LAN 102 is an Ethernet network, including a plurality of individual layer 2 devices (not separately depicted), contained within a single office building. A plurality of hosts is connected to the LAN 102 through which they may communicate with each other. As depicted, information handling system 100 includes three hosts: a host 106A, a host 106B, and a host 106C. LAN 102 is connected to the campus network 104 by a plurality of switches and a plurality of edge bridging devices. Switches 108A, 108B, and 108C are closer to LAN 102. Each of switches 108A, 108B, and 108C is a layer 2 device capable of receiving data and control packets from LAN 102. In this configuration, LAN 102 may be an access LAN.

Each of the plurality of switches is coupled to each of the plurality of edge bridging devices, including bridging device 110A, bridging device 110B, and bridging device 110C. Campus network 104 is made of up similar bridging devices that may be considered core bridging devices rather than edge bridging devices. Edge bridging devices are so called because they operate at the edge of campus network 104, providing ingress to and egress from campus network 104.

In the depicted embodiment, bridging devices 110A, 110B, and 110C and the bridging devices of campus network 104 are routing bridge devices (RBridges) and will be referred to throughout the disclosure as RBridges 110A, 110B, and 110C. RBridges 110A, 110B, and 110C and campus network 104 support the Transparent Interconnect of Lots of Links (TRILL) protocol. The TRILL protocol is a protocol defined by the Internet Engineering Task Force. That facilitates layer 2 routing using a MAC addresses. RBridges are network devices that implement the TRILL protocol and that run an intermediate system to intermediate system (IS-IS) protocol for link state packet routing. Thus, campus network 104 is a TRILL campus network.

Additionally, in the depicted embodiment, LAN 102 may be a broadcast LAN with a number of virtual local area networks (VLANs) configured in LAN 102. Since RBridges 110A, 110B, and 110C are all connected to LAN 102 through the switches 108A, 108B, and 108C, these RBridges may be configured to elect a designated routing bridge (DRB) for LAN 102 after exchanging TRILL "Hello" packets. The "Hello" packets contain identifiers and nearest neighbors of each of these RBridges. The RBridges that are not elected as the DRB are either back-up DRBs or non-DRBs. After being elected, the DRB may appoint a VLAN forwarder for each of the VLANs configured in LAN 102. In the depicted embodiment, RBridge 110B is elected as the DRB and then appoints RBridge 110A to serve as the VLAN forwarder for a VLAN 120 in LAN 102. As depicted, VLAN 120 includes only the depicted hosts 106A, 106B, and 106C and switch 108A.

The circled numerals in FIG. 1 aid in discussing what occurs when a host in VLAN 120 sends a flooding packet, which could be an unknown unicast packet, an unknown multicast packet, or a broadcast packet. When host 106A sends a flooding packet, the packet is first transmitted to LAN 102. Second, from LAN 102, the packet is sent to the connected members of VLAN 120, including host 106B, host 106C, and switch 108A. Switch 108A has all its ports as members of VLAN 120. This includes a port connected LAN 102, and one port each connected to RBridges 110A, 110B, and 110C. Switch 108A can read the VLAN tag contained in the packet to determine that the packet is associated with VLAN 120. So, third, since the packet is a flooding packet, switch 108A forwards the packet to each of RBridges 110A, 110B, and 110C.

Although RBridges 110A, 110B, and 110C each receive the packet, only RBridge 110A has been designated by the DRB (in this embodiment, RBridge 110B) as the VLAN forward for VLAN 120. Each RBridge detects the VLAN tag in the received packet, determining that the packet is associated with VLAN 120. Fourth, the VLAN forwarder (RBridge 110A) ingresses the flooding packet into campus network 104, and RBridges 110B and 110C both simply drop the packet. This prevents the packet from being introduced into campus network 104 in duplicate or triplicate and preventing numerous conflicts.

In the reverse, the VLAN forwarder may operate in a similar manner. For example, RBridge 110A receives a TRILL data packet from campus 104 to be broadcast on VLAN 120, since it contains a VLAN 120 tag. RBridge 110A forwards to packet to switch 108A, and switch 108A floods the packet onto all the member ports of VLAN 120, except the port on which it was received, i.e. the port linking switch 108A to RBridge 110A. Thus, switch 108A may forward the packet into LAN 102 and to RBridges 110B and 110C. From LAN 102, the packet may reach hosts 106A, 106B, and 106C, but because RBridges 110B and 110C are not designated by the DRB as VLAN forwarder for VLAN 120, they both blindly drop the packet. Again, this prevents the packet from re-entering campus network 104, avoiding loops within campus network 104. However, having switch 108A forward VLAN packets to RBridges other than the designated VLAN forwarder may consume considerable resources on the links connecting the switches to the edge RBridges.

Figure 2:
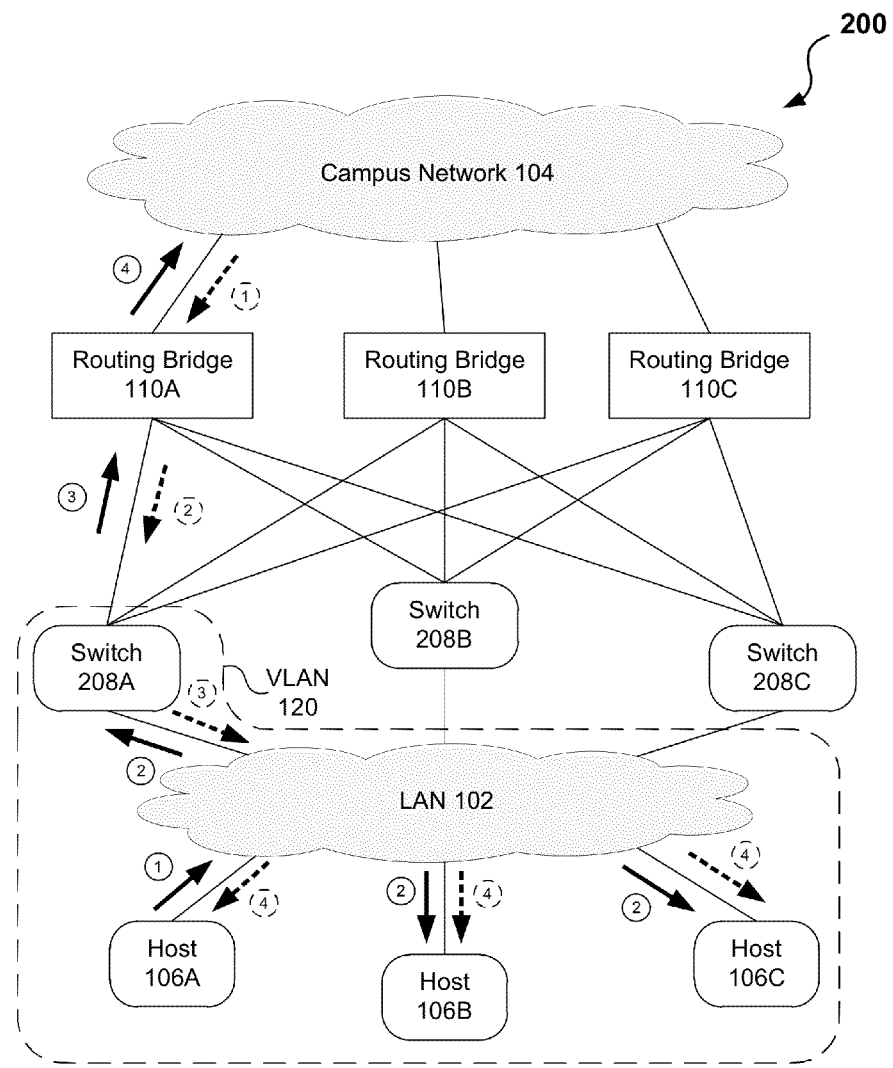
FIG. 2 depicts an information handling system that includes a local-area network connected to a campus network, the networks being interconnected by snooping switches according to an embodiment.

FIG. 2 is a schematic diagram is an information handling system 200 which may offer link bandwidth conservation between two networks. Many of the features of information handling system 200 are similar to those of information handling system 100 of FIG. 1. Where the features are similar, the same numbers have been used to designate the like features. Thus, information handling system 200 includes a LAN 102 connected to a plurality of hosts and a campus network 104. Three hosts, hosts 106A, 106B, and 106C are depicted as being connected to LAN 102. In practice however, many more hosts may be connected by LAN 102. In the depicted embodiment, LAN 102 is connected to a switch 208A, a switch 208B, and a switch 208C, each of which is connected to a bridging device 110A, a bridging device 110B, and an a bridging device 110C. These three bridging devices are connected to campus network 104.

In the depicted embodiment, bridging devices 110A, 110B, and 110C and campus network 104 implement the TRILL protocol. Thus, bridging devices 110A, 110B, and 110C and the numerous devices collectively referred to as campus network 104 are routing bridges (RBridges), which are devices that implement the TRILL protocol. Bridging devices 110A, 110B, and 110C are referred to as RBridges 110A, 110B, and 110C. Further, in the depicted embodiment, switches 208A, 208B, and 208C are top-of-rack (TOR) Layer 2 switches.

In information handling system 200, when host 106A sends a flooding packet to all members of VLAN 120, the packet (with an identifying VLAN tag) first goes to LAN 102. Second, the packet goes to the members of VLAN 120 immediately connected to LAN 102, including hosts 106B and 106C and switch 208A. As depicted, switch 208A has ports connected to LAN 102 and RBridges 110A, 110B, and 110C. However, switch 208A has a port bitmap associated with VLAN 120. The port bitmap allows switch 208A to identify which of its ports are associated with or members of the VLAN. The port bitmap may indicate that for flooding traffic associated with VLAN 120 only two ports on switch 208A should be associated with VLAN 120: a port connected to RBridge 110A and a port connected to LAN 102. Thus, switch 208A may read the VLAN tag of the packet, and then even though switch 208A has ports connected to RBridges 110B and 110C, flooding packet will not be sent over those ports.

The following example follows the numbering of the solid-line circles. A broadcast packet is first transmitted by host 106A to LAN 102. Second, since the packet is intended for all members of VLAN 120, the packet is then sent to hosts 106B and 106C and switch 208A. Third, when switch 208A receives the packet and recognizes that it is a broadcast packet on VLAN 120, switch 208A checks its port bitmap, sees only the port to RBridge 110A and the receiving port as being members of VLAN 120, and sends the packet over the VLAN-member port to RBridge 110A. Fourth, RBridge 110A, which is the designated VLAN forwarder for VLAN 120, encapsulates the packet and ingresses it into the campus network 104. By sending the packet only to RBridge 110A rather than to RBridges 110B and 110C bandwidth may be conserved on these links for other traffic.

In another example, this example following the numbering in the dashed-line circles, a broadcast packet intended for VLAN 120 is first sent through campus network 104 to edge RBridge 110A. Second, RBridge 110A sends the packet to switch 208A. Switch 208A identifies that the packet as associated with VLAN 120 by reading its VLAN tag and checks its port bitmap to determine the VLAN-member ports. Third, since only the receiving port and the port to LAN 102 are included in the port bitmap, switch 208A only forwards the packet to LAN 102. Switch 208A does not forward the packet to RBridges 110B and 110C, even though they are also connected to switch 208A's ports. Fourth, once in LAN 102, the packet is flooded to all the members of VLAN 120 connected to LAN 102. This includes hosts 106A, 106B, and 106C. By forwarding the packet only to LAN 102 and not back to RBridges 110B and 110C, information handling system 200 may conserve bandwidth on these links for other traffic.

Figure 3:
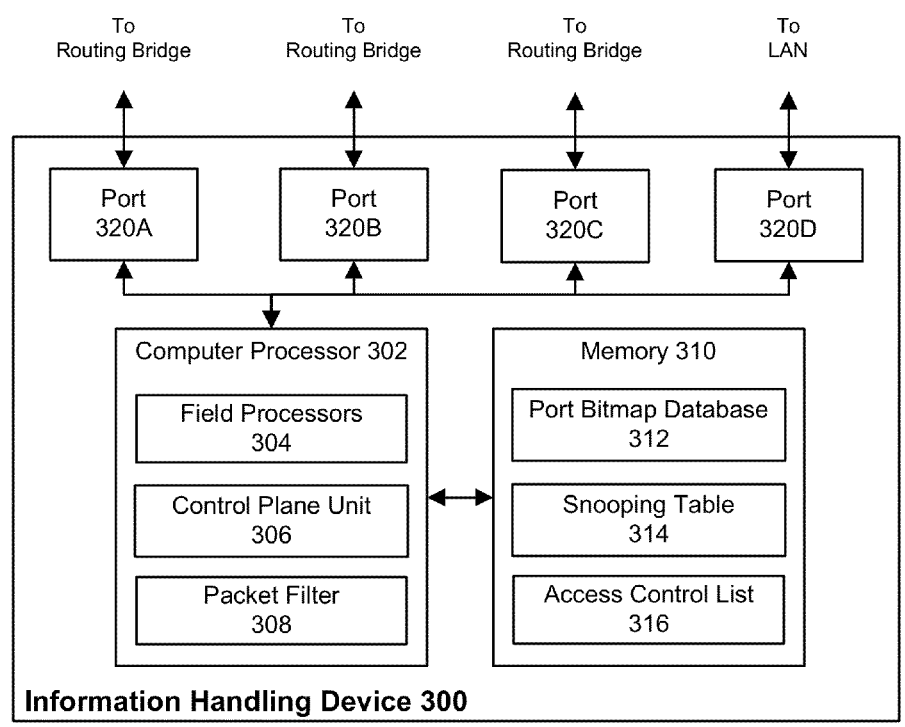
FIG. 3 depicts a functional representation of a switch such as may be used as an information handling device of FIG. 2.

FIG. 3 is a functional diagram of an information handling device 300, which may be used for implementing an information handling system like information handling system 200 of FIG. 2. Information handling device 300 may be a device capable of implementing a layer 2 switch. For brevity, information handling device 300 will be referred to hereafter as switch 300.

Switch 300 includes a plurality of processing modules provided by computer processor 302. Computer processor 302 is in communication with a computer memory and a plurality of ports to provide for routing packets between its ports to transmit packets from a device connected on one port to another device connected on another port. The plurality of processing modules provided by computer processor 302 include a number of field processors 304, a control plane unit 306, and a selective packet filter 308. These modules may be provided by application specific integrated circuits in connection with computer processor 302 and the modules may also be provided by non-transient, computer readable media with instructions thereon that, when executed by computer processor 302, provide these processing modules. For example, the instructions could be provided on memory 310, which may include RAM, ROM, flash memory, or another suitable storage medium. Memory 310 also provides storage for a snooping table 314 and a set of access control list (ACL) rules 316, which will be discussed in more detail later on.

As mentioned, switch 300 includes a plurality of ports. The depicted embodiment includes four ports: a port 320A, a port 320B, a port 320C, each connected to an RBridge (not depicted), and a port 320D connected to a LAN (also not depicted). Each of ports 320A through 320D provides for input from and output to its respective connected device.

In embodiments in which the connected bridging devices are RBridges, switch 300 may receive TRILL packets from the three connected RBridges. Switch 300 is configured to determine which RBridge is the VLAN forwarder for each VLAN of which switch 300 has member ports. Switch 300 is also further configured to selectively transmit flooding packets to the VLAN forwarder RBridge and not to connected non-VLAN forwarder RBridges for the VLAN. These configurations may be achieved by snooping TRILL IS-IS "Hello" packets, parsing their contents to obtain VLAN forwarder status information, and then programming a port bitmap to exclude local ports connecting to the non-VLAN forwarder RBridges connected to switch 300.

Upon receipt of a TRILL IS-IS "Hello" protocol data unit (PDU) packet, computer processor may snoop a copy of the "Hello" PDU to control plane unit 306 (CPU), and flood the original packet as normal to all the member ports. Without flooding the original TRILL "Hello" packet on as normal, the ordinary operation of the campus network 104 may be compromised. CPU 306 receives the copy of the "Hello" PDU and looks deep into it, extracting information from which to build the snooping table 314. CPU 306 may first verify if the "Hello" PDU is an IS-IS "Hello" PDU and not a point-to-point "Hello" PDU. If the packet is not a "Hello" PDU, the packet may not be copied and sent to CPU 306 to be snooped. Looking deep into the packet, CPU 306 may extract information from a number of type-length-value (TLV) elements.

In the "Hello" PDU there is a fixed part and a variable part of the packet header. The fixed part of the header contains fields that are always present, and the variable part of the header contains the TLV which permits the flexible encoding of parameters within link state records. These fields are identified by one octet of type (T), one octet of length (L) and "L" octets of value (V). The "Hello" PDU may also contain sub-TLVs, which exist inside TLVs, while TLVs exist inside TRILL control packets. TLVs are used to add extra information to the "Hello" PDU and other packets. Sub-TLVs can be used to add extra information to particular TLVs.

The "Hello" PDU TLVs may include a "Special VLANs and Flags Sub-TLV," a "TRILL Neighbor TLV," and an "Appointed Forwarders Sub-TLV." From the "Special VLANs and Flags Sub-TLV" CPU 306 may extract information to obtain the identifier, or nickname, of the sender of the "Hello" PDU. This nickname may be mapped to the port on which the "Hello" PDU was received. For example, the extracted information may indicate that the "Hello" PDU was sent by an RBridge with the identifier "RB1" and the packet was received on port 302A. This information may be included in snooping table 314, associated "RB1" with port 302A. The "TRILL Neighbor TLV" may provide the neighbors of the sending RBridge, this information too may be added to snooping table 314. This may also include obtaining the media access control (MAC) addresses of the neighboring and sending RBridges.

Additionally, the "Hello" PDUs sent from whichever RBridge is elected DRB may contain an "Appointed Forwarders Sub-TLV". This TLV contains the appointed VLAN forwarder information, such as the identifier or nickname of the RBridge appointed by the DRB to be the VLAN forwarder for a VLAN. In practice, the DRB may appoint an RBridge to be the VLAN forwarder for ranges of VLANs, rather than making individual appointments. Thus, for example, RBridge 110B, having been elected DRB, may appoint RBridge 110A as the VLAN forwarder for all VLANs numbered ranging between 100 and 200. Since VLAN 120 falls within the appointed range of RBridge 110A, RBridge 110A is the VLAN forwarder for VLAN 120. The information regarding VLAN forwarders from the "Appointed Forwarders Sub-TLV" may also be added to the snooping table 314. The source RBridge of the "Appointed Forwarders Sub-TLV" may also be indicated in the snooping table 314 as being the DRB.

The information contained in snooping table 314 allows for the identification of which of RBridges 110A, 110B, and 110C is the VLAN forwarder for a given VLAN. This information may be used by switch 300 to selectively filter specific packets to prevent unnecessarily flooding packets to RBridges that will drop them. This is done by creating a new port bitmap for each VLAN, and storing the port bitmap in the port bitmap database 312.

An example is provided here to discussion the creation of a net port bitmap. As part of this example, switch 300 of FIG. 3 is being used as switch 208A of FIG. 2. An initial port bitmap may be created that includes all of the member ports of VLAN 120 on the list. For switch 300, this includes listing ports 320A, 320B, 320C, and 320D. Computer processor 302 may perform a lookup of snooping table 314 using these ports and determine which of the ports is connected to the VLAN forwarder for VLAN 120. In this example, the lookup may indicate that RBridge 110A is the VLAN forwarder for VLAN 120. The lookup may also determine the neighbors of the VLAN forwarder. If the DRB port is in the initial listing of ports, then a lookup is performed for each of the RBridges indicated as neighbors of the VLAN forwarder, and the ports by which those RBridges are connected to switch 300 are identified. If these neighbor RBridges do not have the same VLAN forwarder indicated in snooping table 314, they may be excluded from the VLAN port bitmap. This VLAN port bitmap may be stored in port bitmap database 312.

In other embodiments, after the initial port bitmap is created and the appointed VLAN forwarder for the VLAN is determined from snooping table 314, all RBridges that are not the appointed VLAN forwarder may be removed from the port bitmap. Thus, in this example, the port bitmap for the VLAN may include the port 320A to the VLAN forwarder and port 320D to LAN 102. This new port bitmap may be applied outgoing packets, while not being applied to incoming packets. Thus, switch 300 may provide for a separate VLAN ingress and egress checks.

At a deeper level, switch 300 may use the new port bitmap in the following manner Switch 300 may be configured to handle unknown unicast, unknown multicast, and broadcast packets differently than known unicast and known multicast packets. This may be handled by the packet filter 308, which may be configured to distinguish between unknown unicast, unknown multicast, and broadcast packets on one hand and normal unicast packets on the other. For example, packet filter 308 may include two separate registers, one for handling the normal unicast packets, and the other for handling the unknown unicast, unknown multicast, and broadcast packets. Alternatively, each of these four listed types of packets may have a separate register so that each can be handled independently of the others.

In one embodiment, a BROADCOM® TRIDENT™ or TRIUMPH™ chipset may be used to provide this capability, but other embodiments, another chipset or other chipsets may be used to provide the functions disclosed herein for the operation of switch 300. The port bitmap database 312 may be used to modify the associated register for each of the four listed types of packets, such that packet filter 308 may apply one or more blocking masks. Packet filter 308 may apply a first blocking mask for all unknown unicast packets, a second blocking mask for all unknown multicast packets, and a third blocking mask for all broadcast packets. A VLAN profile may be created using the port bitmap, and the VLAN profile includes settings for the blocking masks.

In one embodiment, the VLAN profile may be used to apply the masks, so that the settings for the masks indicate which VLAN-member ports should be blocked. In another embodiment, the VLAN profile may be used to remove the masks being applied to all unknown unicast, unknown multicast, and broadcast packs. So, following the current example, in some embodiments, the VLAN profile may indicate that the blocking masks should be applied for ports 320B and 320C, while in other embodiments, the VLAN profile may indicate that the blocking masks should be removed for ports 320A and 320D depending on a default status of blocking masks in a particular embodiment.

In general, control protocol packets, such as TRILL control packets, that are to be flooded to all the member ports of a VLAN should not be filtered or subjected to masking as native data packets are. In order to maintain the proper flow of data traffic, the normal protocol operations in the network must be maintained. This can be achieved using appropriate mechanisms provided by the hardware used in switch 300.

Figure 4:
FIG. 4 is a diagram of a snooping table as could be found on an information handling device according to an embodiment.

FIG. 4 is an exemplary snooping table 314 as may be formed switch 300 of FIG. 3 and stored in memory 310. Snooping table 314 contains information regarding the appointed VLAN forwarder for VLANs having member ports on switch 300. An RBridge ID column 402 indicates the identifier or nickname of the RBridge that serves as the VLAN forwarder for the VLANs indicated in the VLAN mapping column 406. An ingress port ID column 404 may indicate which port on switch 300 is connected to the VLAN forwarder RBridge. Additionally, an RBridge neighbors list column 408 may indicate the neighbors of the RBridge identifiers in column 402. The information contained in exemplary RBridge 402 may be used create port bitmaps and VLAN profiles, or VLAN mappings, as discussed above.

Figure 5:
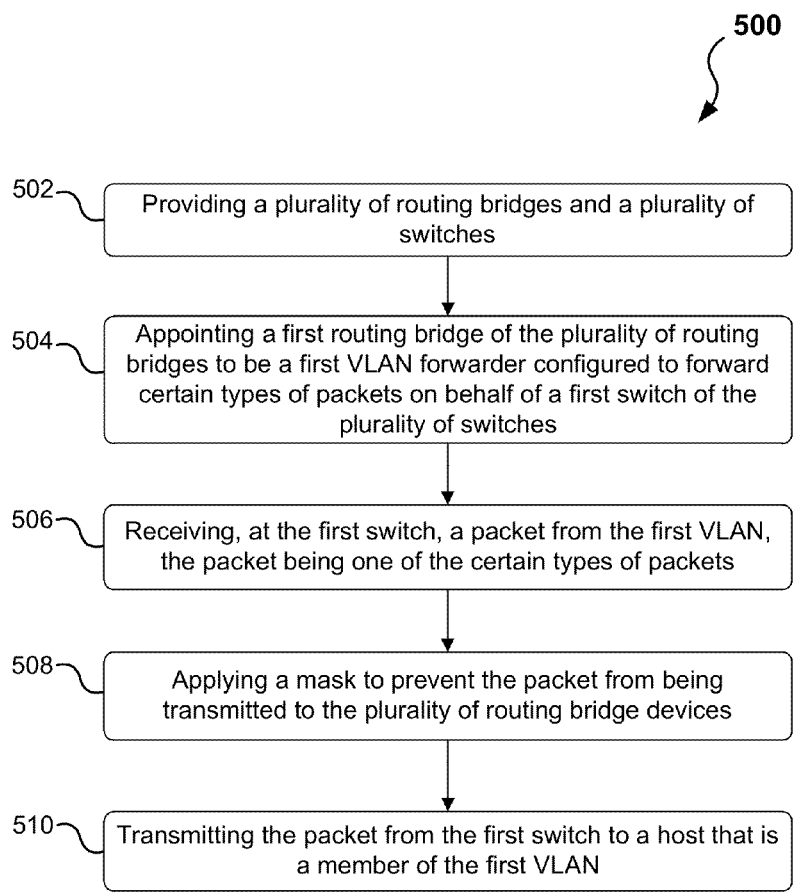
FIG. 5 is a flowchart of a method for providing link bandwidth conversation in a local-area network connected to a campus network in an information handling system according to an embodiment.

FIG. 5 is a method 500 for providing link bandwidth conversation in a LAN connected to a larger network, such as an access LAN connected to a TRILL campus network. Method 500 may include a step 502 of providing a plurality of routing bridge devices and a plurality of switches. In step 504, a designated one of the routing bridges may appoint a first routing bridge device of the plurality of routing bridge devices to be a first VLAN forwarder. The first VLAN forwarder may be configured to forward certain types of packets on behalf of a first switch of the plurality of switches, wherein the first switch may be associated with a first VLAN. In step 506, the first switch receives a packet from the first VLAN, the packet being one of the certain types of packets. The switch applies a mask to prevent the packet from being transmitted to the plurality of routing bridge devices, in step 508. In step 510 of method 500, the switch transmits the packet from the first switch to the a host that is a member of the first VLAN.

To better explain method 500, reference will be made to information handling system 200 of FIG. 2 and switch 300 of FIG. 3. Thus, information handling system 200 includes a plurality of RBridges 110A, 110B, and 110C, and a plurality of switches 208A, 208B, and 208C (step 502). These switches may include all the features described in connection with switch 300 of FIG. 3. As the RBridges 110A, 110B, and 110C connect to an access LAN 120, one of the bridge devices may be elected as the designated RBridge for LAN 120. This designated RBridge may appoint RBridge 110A as the VLAN forwarder for a range of VLANs, including a VLAN 120 that includes switch 208A (step 504). Switch 208A may receive an unknown multicast, a broadcast, or an unknown unicast packet from one of the hosts 106A, 106B, and 106C connected to switch 208A through LAN 102 (step 506). While all the ports on switch 208A are member ports of VLAN 120, switch 208A may internally apply a mask to prevent the packet from being transmitted to RBridges 110B and 110C, since they are not the appointed VLAN forwarder for VLAN 120 (step 508). Normal unicast packets may not have the mask applied to prevent transmission. Even though switch 208A has internally applied a mask to the packet, the mask does not prevent the transmission of the packet to one or more of hosts 106A-B, which are accessible through LAN 102. Each host that is a member of VLAN 120 receives the packet.

In various embodiments of method 500, additional steps may be included. For example, method 500 may also include using switch 208A to snoop "Hello" packets and to parse the TLV contents thereof in order to determine which of the RBridges 110A, 110B, and 110C is the appointed VLAN forwarder for a particular VLAN or for a specified range of VLANs. The TLV contents may be used to form a snooping table that contains a mapping of routing bridge device identifiers to the ports on the switch 208A.

In additional embodiments of method 500, switch 208A may identify its ports and identify one of its ports as being associated with the first VLAN forwarder. These identifications may be used to facilitate the modification of a port bitmap of switch 208A to exclude ports associated with routing bridge devices other than the first VLAN forwarder for first VLAN traffic.

Method 500 may operate so as to provide more than one VLAN with the capability to conserve link bandwidth as described. For example, while RBridge 110A may be the appointed VLAN forwarder for a VLAN 120 that includes switch 208A, RBridge 110C may be the appointed VLAN forwarder for a VLAN 130 (not depicted in FIG. 2) that includes switch 208C. Switch 208C may receive unknown unicast, unknown multicast, and broadcast packets and may transmit the packets to RBridge 110C as the VLAN forwarder for VLAN 130, while blocking their transmission to RBridges 110A and 110B.

Additionally, switch 102A may receive a packet from the LAN and apply a mask to prevent the packet from being transmitted to the plurality of the routing bridge devices other than the first VLAN forwarder if the packet is a flooding packet. Switch 102A may then transmit the packet from the first switch to the first VLAN forwarder, while not transmitting the packet to other routing bridges of the plurality.

Some embodiments of all or part of information handling system 200 include non-transient, tangible, machine-readable media that includes executable code that when run by a processor, such as computer processor 302 of switch 300 in FIG. 3, may cause the processor to perform the steps of method 500 as described above. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory 310 of FIG. 3.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling device, comprising:
a plurality of processing modules provided by a computer processor, the plurality of processing modules including a selective packet filter and a control plane unit;
a memory in communication with the plurality of processing modules, the memory storing a port bitmap and a snooping table; and
a plurality of ports, at least one Ethernet port for connecting the information handling device to an Ethernet network, and a plurality of bridging ports for connecting the information handling device to a plurality of routing bridges of a campus network;
wherein:
the port bitmap includes, for each virtual local area network (VLAN) to which the information handling device belongs, a list of ports from the plurality of ports on which packets for a corresponding VLAN are flooded, the list of ports comprising at most one of the plurality of bridging ports.

2. The information handling device of claim 1, wherein the snooping table includes an identifier of a first routing bridge of the plurality of routing bridges, the first routing bridge configured to be a first VLAN forwarder for a first VLAN, the first routing bridge being connected to the information handling device via a first bridging port identified in the port bitmap for the first VLAN.

3. The information handling device of claim 1, wherein one or more of the processing modules provided by the computer processor, is provided by software being executed by the computer processor.

4. The information handling device of claim 1, wherein the information handling device floods packets for a first VLAN to the campus network via the at most one of the plurality of routing ports corresponding to the first VLAN based on the port bitmap.

5. The information handling device of claim 4, wherein the flooding packets include unknown unicast packets, broadcast packets, and/or unknown multicast packets.

6. The information handling device of claim 1, wherein the plurality of processing modules includes a snooping module for snooping packets and creating the snooping table.

7. The information handling device of claim 6, wherein the snooping module is configured to snoop intermediate system to intermediate system (IS-IS) "Hello" packets and to parse type-length-value (TLV) contents of the IS-IS "Hello" packets, the TLV contents including neighboring device information and designated VLAN forwarder information.

8. The information handling device of claim 1, wherein the port bitmap includes a first port mapping for flooding traffic associated with a VLAN and a second port mapping for non-flooding traffic associated with the VLAN.

9. The information handling device of claim 1, wherein the snooping table comprises one or more entries, each entry associating a routing bridge identifier, a port identifier, and one or more VLANs.

10. The information handling device of claim 9, wherein each entry further associates with the routing bridge identifier a list of neighboring routing bridges from the plurality of routing bridges.

11. The information handling device of claim 9, wherein the routing bridge identifier in each entry corresponds to a VLAN forwarder for each of the one or more VLANs.

\* \* \* \* \*